No. 751,291. PATENTED FEB. 2, 1904.
F. JAEGER.
MIRROR.
APPLICATION FILED JUNE 4, 1903.
NO MODEL.
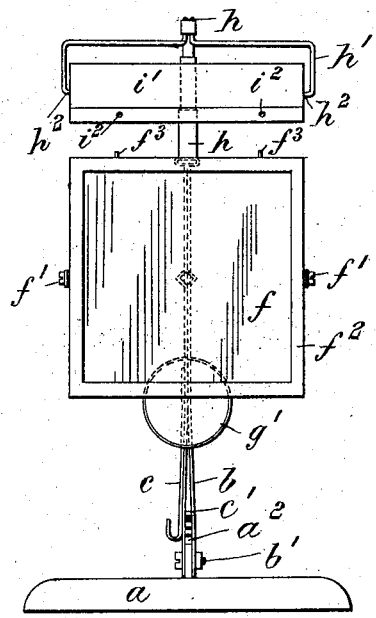
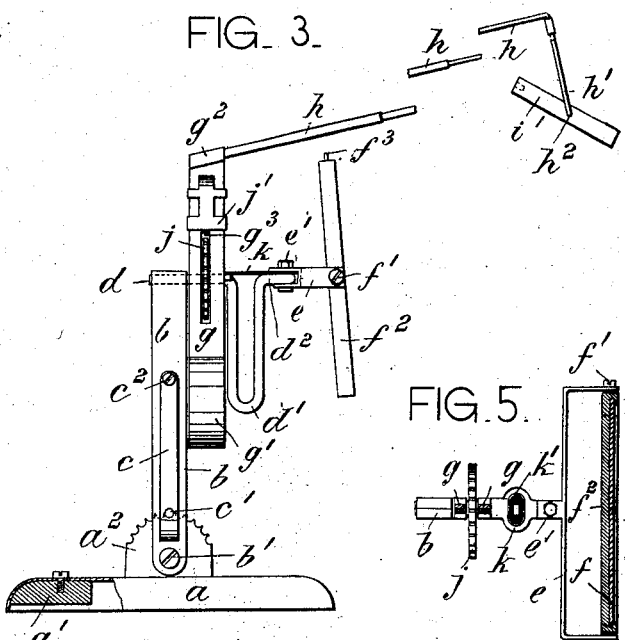
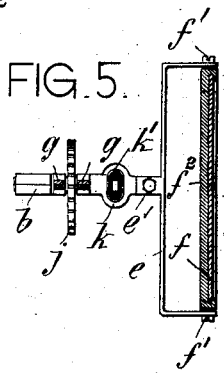
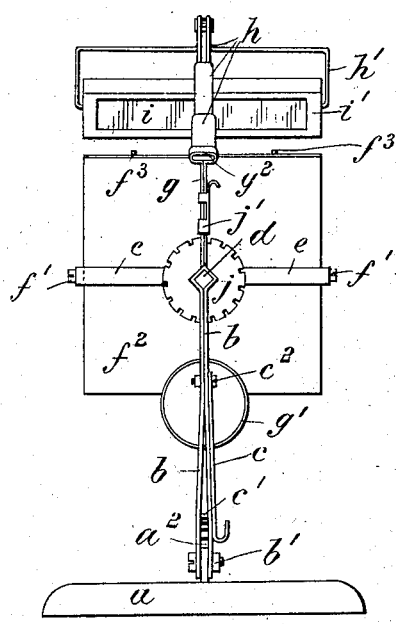
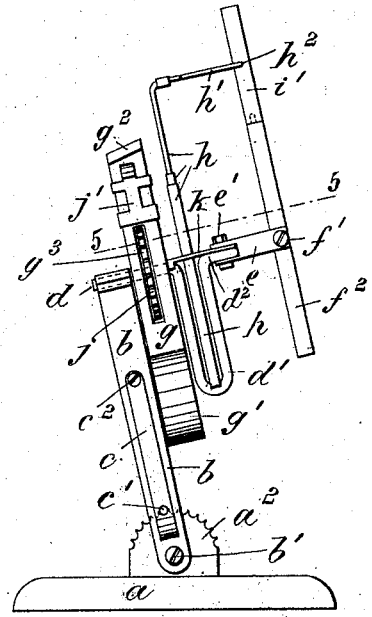
Witnesses:
Arthur Jumper
William Schulz
Inventor:
Ferdinand Jaeger
by his attorney
Franko Friesen No. 751,291. Patented February 2, 1904.

UNITED STATES PATENT OFFICE.

FERDINAND JAEGER, OF NEW YORK, N. Y.

MIRROR

SPECIFICATION forming part of Letters Patent No. 751,291, dated February 2, 1904.

Application filed June 4, 1903. Serial No. 159,999. (No model.)

*To all whom it may concern:*

Be it known that I, FERDINAND JAEGER, a citizen of the United States, residing at New York city, Brooklyn, county of Kings, and State of New York, have invented certain new and useful Improvements in Mirrors, of which the following is a specification.

This invention relates to a mirror which may be readily set at different angles and may thus be adjusted to fully reflect the sides, top, and back of the head.

In the accompanying drawings, Figure 1 is a front elevation of my improved mirror; Fig. 2, a rear elevation thereof; Fig. 3, a side elevation, partly in section, with the telescoping arm partly broken away; Fig. 4, a side elevation showing the parts in a different position; and Fig. 5, a cross-section on line 5 5, Fig. 4.

The letter $a$ represents a base-plate, weighted, preferably, as at $a'$ and provided with an upwardly-extending notched segment $a^2$. This segment is straddled by the forked lower end of a post $b$, pivoted thereto at $b'$ and adapted to be tilted backward and forward. A pin $c'$ on the lower end of a spring $c$, which is secured to post $b$ at $c^2$, is adapted to engage either one of the notches of segment $a^2$ by passing through a perforation of post $b$. By means of the mechanism described the post may be locked at any inclination to which it may be set.

From the upper end of post $b$ projects forwardly a shaft $d$, having a straight rear section and a U-shaped front section $d'$. To the forward end $d^2$ of the shaft $d$ is fulcrumed at $e'$ a horizontally-swinging bail $e$. To this bail is in turn pivoted at $f'$ the frame $f^2$ of a main reflector or mirror $f$, which may be tilted backward and forward. The pivots $f'$ extend at right angles to the pivot $e'$, so that a universal joint is formed between the mirror and its supporting-shaft, which permits the position of the mirror to be freely adjusted.

Upon the straight rear section of shaft $d$ is free to turn a rotatable bar $g$, having a counterweight $g'$ at its lower end. At its upper end the bar $g$ has an inclined eye $g^2$ for the reception of a removable and extensible arm $h$, made of several telescoping sections. The foremost section of arm $h$ is extended laterally to form a bail $h'$, to which is pivoted at $h^2$ the frame $i'$ of an auxiliary mirror or reflector $i$. This mirror is normally placed in front of the main reflector $f$, and by properly adjusting the reflectors any part of the head interposed between them may be readily exposed to view.

In order to lock the bar $g$ in any of its inclined positions, it is slotted, as at $g^3$, for the reception of a notched disk $j$, which is mounted immovably upon shaft $d$. The disk $j$ is adapted to be engaged by a slidable catch $j'$, that straddles bar $g$ and is thus adapted to lock the bar to the shaft $d$.

Across the U-shaped section $d'$ of shaft $d$ extends a bridge $k$, having a perforation $k'$, adapted for the reception of the arm $h$.

Normally the auxiliary reflector $i$ faces the main reflector $f$, Fig. 3, with the arm $h$ extended. If it is desired to remove the auxiliary reflector, the arm $h$ is withdrawn from eye $g^2$ and contracted. The arm is then passed through the perforation $k'$ of bridge $k$, with its lower end resting upon the bottom of the U-shaped section $d'$ of shaft $d$. The frame $i'$ is then placed upon frame $f^2$, Fig. 4, and is locked thereto by means of pin $f^3$ on frame $f^2$ engaging corresponding perforations $i^2$ of frame $i'$. Thus the two mirrors will be fitted above one another, so as to face in the same direction.

It will be seen that by my invention an infinite variety of positions may be imparted to both mirrors, so that a complete reflection of any part of the human body may be obtained.

What I claim is—

1. A mirror composed of a post, a shaft carried thereby, a main reflector pivotally connected to the shaft, a bar rotatable upon the shaft, an arm secured to the bar, and an auxiliary reflector connected to the arm, substantially as specified.

2. A mirror composed of a post, a shaft carried thereby, a main reflector pivotally connected to the shaft, a slotted bar rotatable upon the shaft, a notched disk mounted upon the shaft, a catch on the bar adapted to engage said disk, an arm secured to the bar, and an auxiliary reflector connected to the arm, substantially as specified.

3. A mirror composed of a notched segment, a forked post pivoted thereto, a catch on the post adapted to engage the segment, a shaft carried by the post, a main reflector pivotally connected to the shaft, a bar rotatable upon the shaft, an arm secured to the bar, and an auxiliary reflector connected to the arm, substantially as specified.

4. A mirror composed of a pivoted post, means for locking the post in position, a shaft carried by the post, a bar rotatable upon the shaft, means for locking the bar to the shaft, an arm secured to the bar, a main reflector connected to the shaft, and an auxiliary reflector connected to the arm, substantially as specified.

5. A mirror composed of a post, a U-shaped shaft carried thereby, a main reflector pivotally connected to the shaft, a bar rotatable upon the shaft, means for locking the bar in position, an arm removably secured to the bar, an auxiliary reflector connected to the arm, and means for securing the auxiliary reflector to the main reflector, substantially as specified.

Signed by me at New York city, Manhattan, New York, this 3d day of June, 1903.

FERDINAND JAEGER.

Witnesses:
WILLIAM SCHULZ,
F. V. BRIESEN.